United States Patent
Dunn

(10) Patent No.: US 8,766,994 B2
(45) Date of Patent: Jul. 1, 2014

(54) METHOD FOR REDUCING VIDEO IMAGE LATENCY

(75) Inventor: William Dunn, Alpharetta, GA (US)

(73) Assignee: American Panel Corporation, Alpharetta, GA (US)

( * ) Notice: Subject to any disclaimer, the term of this patent is extended or adjusted under 35 U.S.C. 154(b) by 812 days.

(21) Appl. No.: 12/206,688

(22) Filed: Sep. 8, 2008

(65) Prior Publication Data
US 2009/0256851 A1 Oct. 15, 2009

Related U.S. Application Data

(60) Provisional application No. 61/045,154, filed on Apr. 15, 2008.

(51) Int. Cl.
*G09G 5/36* (2006.01)
(52) U.S. Cl.
USPC .......................................... 345/547; 345/536
(58) Field of Classification Search
USPC .................................................. 345/536, 547
See application file for complete search history.

(56) References Cited

U.S. PATENT DOCUMENTS

| | | | |
|---|---|---|---|
| 6,331,854 B1 * | 12/2001 | Rogers et al. | 345/473 |
| 7,262,776 B1 * | 8/2007 | Wilt et al. | 345/539 |
| 2002/0171640 A1 * | 11/2002 | Bu et al. | 345/208 |
| 2003/0227460 A1 * | 12/2003 | Schinnerer | 345/539 |
| 2007/0279374 A1 * | 12/2007 | Kimura et al. | 345/102 |
| 2009/0073179 A1 * | 3/2009 | George et al. | 345/564 |

* cited by examiner

*Primary Examiner* — Kee M Tung
*Assistant Examiner* — Peter Hoang
(74) *Attorney, Agent, or Firm* — Standley Law Group LLP

(57) ABSTRACT

Image latency is reduced in a video display system where an image is displayed for a stroke video frame period. The system has a display device and a plurality of memory buffers, each of which is adapted to receive image data (in a receiving condition) or to display data to the display device (in a display condition). The stroke video frame period is divided into at least two time periods and the number of memory buffers provided is at least the number of time periods per stroke video frame period. One of the memory buffers is in the display condition for a first time period, with the remaining memory buffers in the receiving condition. At the end of the time period, the memory buffers are rotated so that the displayed memory buffer moves to the receiving condition and one of the receiving buffers moves into the display condition.

20 Claims, 8 Drawing Sheets

| | | T1 | T2 | T3 | T4 | T5 | T6 | T7 | T8 |
|---|---|---|---|---|---|---|---|---|---|
| | Buffer | A | A | A | A | B | B | B | B |
| Double | Q1 | 0 | 0 | 0 | 0 | 1 | 1 | 1 | 1 |
| Buffer | Q2 | 0 | 0 | 0 | 0 | 1 | 1 | 1 | 1 |
| | Q3 | 0 | 0 | 0 | 0 | 1 | 1 | 1 | 1 |
| | Q4 | 0 | 0 | 0 | 0 | 1 | 1 | 1 | 1 |
| | Buffer | D | A | B | C | D | A | B | C |
| Embodiment | Q1 | E | 1 | 1 | 1 | E | 2 | 2 | 2 |
| 1 | Q2 | 0 | E | 1 | 1 | 1 | E | 2 | 2 |
| | Q3 | 0 | 0 | E | 1 | 1 | 1 | E | 2 |
| | Q4 | 0 | 0 | 0 | E | 1 | 1 | 1 | E |
| | Buffer | E | A | B | C | D | E | A | B |
| Embodiment | Q1 | 0 | 1 | 1 | 1 | 1 | 2 | 2 | 2 |
| 2 | Q2 | 0 | 0 | 1 | 1 | 1 | 1 | 2 | 2 |
| | Q3 | 0 | 0 | 0 | 1 | 1 | 1 | 1 | 2 |
| | Q4 | 0 | 0 | 0 | 0 | 1 | 1 | 1 | 1 |
| | Buffer | D | A | B | C | D | A | B | C |
| Embodiment | Q1 | E | 1 | 1 | E | E | 2 | 2 | E |
| 3 | Q2 | E | E | 1 | 1 | E | E | 2 | 2 |
| | Q3 | 0 | E | E | 1 | 1 | E | E | 2 |
| | Q4 | 0 | 0 | E | E | 1 | 1 | E | E |

| Buffer | | T1 | T2 | T3 | T4 | T5 | T6 | T7 | T8 |
|---|---|---|---|---|---|---|---|---|---|
| A | Status | R1, write | F, display | R3, E&W | R2, write | R1, write | F, display | R3, E&W | R2, write |
| | Q1 | 1 | 1 | E | E | 2 | 2 | E | E |
| | Q2 | E | E | E | E | E | E | E | E |
| | Q3 | 0 | 0 | 1 | 1 | 2 | 1 | 2 | 2 |
| | Q4 | 0 | 0 | E | 1 | 1 | 1 | E | 2 |
| B | Status | R2, write | R1, write | F, display | R3, E&W | R2, write | R1, write | F, display | R3, E&W |
| | Q1 | 1 | 1 | 1 | E | 2 | 2 | 2 | E |
| | Q2 | E | 1 | 1 | E | E | 2 | 2 | E |
| | Q3 | E | E | E | E | E | E | E | E |
| | Q4 | 0 | 1 | 1 | 1 | 1 | 2 | E | 2 |
| C | Status | R3, E&W | R2, write | R1, write | F, display | R3, E&W | R2, write | R1, write | F, display |
| | Q1 | E | E | 1 | 1 | 2 | 2 | 2 | 2 |
| | Q2 | E | E | 1 | 1 | E | 2 | 2 | 2 |
| | Q3 | E | E | E | 1 | E | E | E | 2 |
| | Q4 | 0 | E | E | E | E | E | E | E |
| D | Status | F, display | R3, E&W | R2, write | R1, write | F, display | R3, E&W | R2, write | R1, write |
| | Q1 | E | E | E | E | E | E | E | E |
| | Q2 | 0 | E | 1 | 1 | 1 | E | 2 | 2 |
| | Q3 | 0 | E | 1 | 1 | 1 | E | 2 | 2 |
| | Q4 | 0 | E | E | 1 | 1 | E | E | 2 |

FIGURE 2

| Buffer | | T1 | T2 | T3 | T4 | T5 | T6 | T7 | T8 |
|---|---|---|---|---|---|---|---|---|---|
| A | Status | R1, write | F, display | R4, E&W | R3, write | R2, write | R1, write | F, display | R4, E&W |
| | Q1 | 1 | 1 | E | E | E | 2 | 2 | E |
| | Q2 | 0 | 0 | E | E | 2 | 2 | 2 | E |
| | Q3 | 0 | 0 | 1 | 1 | 1 | 1 | 1 | 2 |
| | Q4 | 0 | 0 | E | 1 | 1 | 1 | 1 | E |
| B | Status | R2, write | R1, write | F, display | R4, E&W | R3, write | R2, write | R1, write | F, display |
| | Q1 | 1 | 1 | 1 | E | E | E | 2 | 2 |
| | Q2 | E | 1 | 1 | E | E | 2 | 2 | 2 |
| | Q3 | 0 | 0 | 0 | E | E | 1 | 2 | 2 |
| | Q4 | 0 | 0 | 0 | 1 | 1 | 1 | 1 | 1 |
| C | Status | R3, write | R2, write | R1, write | F, display | R4, E&W | R3, write | R2, write | R1, write |
| | Q1 | 1 | 1 | 1 | 1 | E | E | E | 2 |
| | Q2 | E | E | 1 | 1 | E | E | 2 | 2 |
| | Q3 | 0 | 0 | 0 | 1 | E | E | 2 | 2 |
| | Q4 | 0 | 0 | 1 | 0 | 1 | E | E | E |
| D | Status | R4, E&W | R3, write | R2, write | R1, write | F, display | R4, E&W | R3, write | R2, write |
| | Q1 | 1 | 1 | 1 | 1 | 1 | E | E | E |
| | Q2 | E | E | E | 1 | 1 | E | E | 2 |
| | Q3 | E | E | E | 1 | 1 | E | E | 2 |
| | Q4 | 0 | E | E | 1 | 1 | 1 | E | 2 |
| E | Status | F, display | R4, E&W | R3, write | R2, write | R1, write | F, display | R4, E&W | R3, write |
| | Q1 | 0 | E | E | E | 2 | 2 | E | E |
| | Q2 | 0 | E | E | 2 | 1 | 1 | E | 2 |
| | Q3 | 0 | 2 | E | 1 | 1 | 1 | 2 | 2 |
| | Q4 | 0 | E | E | 1 | 1 | 1 | E | 2 |

FIGURE 4

| Buffer | | T1 | T2 | T3 | T4 | T5 | T6 | T7 | T8 |
|---|---|---|---|---|---|---|---|---|---|
| | Status | R1, write | F, display | R3, E&W | R2, E&W | R1, write | F, display | R3, E&W | R2, E&W |
| A | Q1 | 1 | 1 | E | E | 2 | 2 | E | E |
| | Q2 | E | E | E | E | E | E | E | E |
| | Q3 | E | E | 1 | E | E | E | 2 | E |
| | Q4 | 0 | 0 | E | 1 | 1 | 1 | E | 2 |
| | Status | R2, E&W | R1, write | F, display | R3, E&W | R2, E&W | R1, write | F, display | R3, E&W |
| B | Q1 | 1 | 1 | 1 | E | 2 | 2 | 2 | E |
| | Q2 | E | E | 1 | E | E | E | 2 | E |
| | Q3 | E | E | E | E | E | E | E | E |
| | Q4 | E | E | E | 1 | E | E | E | 2 |
| | Status | R3, E&W | R2, E&W | R1, write | F, display | R3, E&W | R2, E&W | R1, write | F, display |
| C | Q1 | 1 | 1 | 1 | E | 2 | 2 | 2 | E |
| | Q2 | E | E | 1 | 1 | E | E | E | 2 |
| | Q3 | E | E | E | E | E | E | E | 2 |
| | Q4 | E | E | E | E | E | E | E | E |
| | Status | F, display | R3, E&W | R2, E&W | R1, write | F, display | R3, E&W | R2, E&W | R1, write |
| D | Q1 | E | E | E | E | E | E | E | E |
| | Q2 | E | E | E | E | 1 | E | E | E |
| | Q3 | 0 | E | 1 | 1 | 1 | 2 | 2 | 2 |
| | Q4 | 0 | E | E | 1 | 1 | E | E | 2 |

FIGURE 5

| | | T1 | T2 | T3 | T4 | T5 | T6 | T7 | T8 |
|---|---|---|---|---|---|---|---|---|---|
| Double Buffer | Buffer | A | A | A | A | B | B | B | B |
| | Q1 | 0 | 0 | 0 | 0 | 1 | 1 | 1 | 1 |
| | Q2 | 0 | 0 | 0 | 0 | 1 | 1 | 1 | 1 |
| | Q3 | 0 | 0 | 0 | 0 | 1 | 1 | 1 | 1 |
| | Q4 | 0 | 0 | 0 | 0 | 1 | 1 | 1 | 1 |
| Embodiment 1 | Buffer | D | A | B | C | D | A | B | C |
| | Q1 | E | 1 | 1 | 1 | E | 2 | 2 | 2 |
| | Q2 | 0 | E | 1 | 1 | 1 | E | 2 | 2 |
| | Q3 | 0 | 0 | E | 1 | 1 | 1 | E | 2 |
| | Q4 | 0 | 0 | 0 | E | 1 | 1 | 1 | E |
| Embodiment 2 | Buffer | E | A | B | C | D | E | A | B |
| | Q1 | 0 | 1 | 1 | 1 | 1 | 2 | 2 | 2 |
| | Q2 | 0 | 0 | 1 | 1 | 1 | 1 | 2 | 2 |
| | Q3 | 0 | 0 | 0 | 1 | 1 | 1 | 1 | 2 |
| | Q4 | 0 | 0 | 0 | 0 | 1 | 1 | 1 | 1 |
| Embodiment 3 | Buffer | D | A | B | C | D | A | B | C |
| | Q1 | E | 1 | 1 | E | E | 2 | 2 | E |
| | Q2 | E | E | E | E | E | E | E | 2 |
| | Q3 | 0 | E | E | 1 | 1 | E | E | 2 |
| | Q4 | 0 | 0 | E | E | 1 | 1 | E | E |

FIGURE 6

| Buffer | | T1 | T2 | T3 | T4 | T5 | T6 | T7 | T8 |
|---|---|---|---|---|---|---|---|---|---|
| A | Status | R1, write | F, display | R3, E&W | R2, write | R1, write | F, display | R3, E&W | R2, write |
|  | P1 | 1 | 1 | E | 2 | 2 | 2 | 3 | 3 |
|  | P2 | 0 | 0 | E | E | 2 | 2 | E | 3 |
|  | P3 | 0 | 0 | 1 | 1 | 1 | 1 | E | 2 |
| B | Status | R2, write | R1, write | F, display | R3, E&W | R2, write | R1, write | F, display | R3, E&W |
|  | P1 | 1 | 1 | 1 | 2 | 2 | 2 | 2 | E |
|  | P2 | E | 1 | 1 | E | 2 | 2 | 2 | 3 |
|  | P3 | 0 | 0 | 0 | E | E | 2 | 2 | E |
| C | Status | R3, E&W | R2, write | R1, write | F, display | R3, E&W | R2, write | R1, write | F, display |
|  | P1 | 1 | 1 | 1 | 1 | E | E | 3 | 3 |
|  | P2 | E | 1 | 1 | 1 | 2 | 2 | 2 | 2 |
|  | P3 | E | E | 1 | 1 | E | 2 | 2 | 2 |
| D | Status | F, display | R3, E&W | R2, write | R1, write | F, display | R3, E&W | R2, write | R1, write |
|  | P1 | 0 | E | E | 1 | 2 | E | 3 | 3 |
|  | P2 | 0 | 1 | 1 | 1 | 1 | 2 | E | 2 |
|  | P3 | 0 | E | 1 | 1 | 1 | 2 | 2 | 2 |

FIGURE 7

| Buffer | | T1 | T2 | T3 | T4 | T5 | T6 | T7 | T8 |
|---|---|---|---|---|---|---|---|---|---|
| A | Status | R1, write | F, display | R2, E&W | R1, write | F, display | R2, E&W | R1, write | F, display |
| | P1 | 1 | 1 | E | 2 | 2 | E | 3 | 3 |
| | P2 | E | E | E | E | E | E | E | E |
| | P3 | 0 | 0 | 1 | 1 | 1 | 2 | 2 | 2 |
| B | Status | R2, E&W | R1, write | F, display | R2, E&W | R1, write | F, display | R2, E&W | R1, write |
| | P1 | 1 | 1 | 1 | 2 | 2 | 2 | 3 | 3 |
| | P2 | E | 1 | 1 | E | 2 | 2 | E | 3 |
| | P3 | E | E | E | E | E | E | E | E |
| C | Status | F, display | R2, E&W | R1, write | F, display | R2, E&W | R1, write | F, display | R2, E&W |
| | P1 | E | E | E | E | E | E | E | E |
| | P2 | 0 | 1 | 1 | 1 | 2 | 2 | 2 | 3 |
| | P3 | 0 | E | 1 | 1 | E | 2 | 2 | E |

FIGURE 9

METHOD FOR REDUCING VIDEO IMAGE LATENCY

CROSS-REFERENCE TO RELATED APPLICATIONS

This application is a non-provisional patent application and claims priority to co-pending application No. 61/045,154 filed Apr. 15, 2008.

TECHNICAL FIELD

Exemplary embodiments relate generally to a method for reducing latency particularly with regard to converting a "stroke" generated video image into a "raster" type display.

BACKGROUND OF THE ART

"Stroke" type video display systems, as typically used in cathode ray tube (CRT) video display units in the 1960s and 1970s, drew their images on a "real time" basis to the screen. That is to say, as soon as a graphic display element is defined, it is "stroked" directly to the phosphor face of the CRT, using x-y deflection of an electron beam and "z" video modulation. Such a stroke system has no refresh memory, so the image on the screen is updated and refreshed at the scan rate of the screen, which is typically 60 Hz, or 16.67 msec. While such stroke systems had other problems associated with them, one advantage possessed by such systems is that they were visible in real time—there was zero latency in the displayed image.

To avoid some of the other problems associated the stroke systems, stroke to raster conversion systems were introduced. In a known stroke to raster conversion technique, the real time image previously stroked to the screen is instead "stroked" in a random x-y manner to a random access memory (RAM), in which a "z" video modulation datum is stored in a matrix comprising x, y data addresses that correspond to x, y locations on the raster display screen, which can be an LCD, a plasma screen, a CRT or the like. This type of a "stroke-to-raster" conversion should provide a worse case latency of less than 16.67 msec, that is, less than one scan of the display when operating at 60 Hz, plus from 0 to 16.67 msec additional. The exact amount of the additional latency depends upon the physical location of the video feature on the display screen. When the video feature is located at an x, y address on the display near the first part of the raster pattern, then the additional latency will be very small. However, when the video feature is located near the end of the raster pattern, the additional latency can be almost an entire scan duration, that is, almost 16.67 msec.

An example of one such early stroke-to-raster conversion technique is provided by a double buffered system for a video display, where a pair of memory buffers is provided for the display of sequential video images on a display screen. In such a system, a first "frame" of video data for producing a first video image is stored in a first buffer, from which the video image data are communicated to the display screen. The buffer providing the display image is also often referred to as the "front" buffer. While the first video image is being displayed on the screen, that is, during its frame time, a second buffer, referred to at this point as the "rear" buffer, is used to prepare a second frame for display on the screen. This preparation entails erasing a prior frame of video data from the second buffer and writing the new set of video data in the second buffer.

At the end of the first frame's frame time, a "swap" command logically converts the second buffer into the front buffer, that is, the video data in the second buffer is now communicated to the display screen. The first buffer, converted into the "rear" buffer by the same swap command, erases the first frame of video data and refreshes itself by building a third frame of video data during the frame time for the second frame.

Once the second frame's frame time has elapsed, a new swap command restores the first buffer to its former status as the front buffer and the second buffer to its former status as the rear buffer. During this frame time, the third frame image is displayed from the first buffer, while the second frame is erased and a fourth frame is built in the second buffer. This process is repeated sequentially.

This system may be abstracted to be represented as a system in which two buffers are present during frame time M. One of the buffers contains video image M and displays it to the screen. Simultaneously, the other buffer erases the video data for video image (M−1) and stores the video data for video image (M+1).

An easily recognized problem of the double buffered system is that the image being presently displayed, that is, image M, is "old," because it was assembled during frame time M−1 and not during frame time M. It will also be recognized that it is the activity in the rear buffer that is generally rate-limiting. While a discrete period of time is required to sweep through the data for display purposes, that is, the so-called "frame period", the frame time is a longer period, comprising a small integral number of frame periods, allowing the preparation of the subsequent video image. The time from when the storage of a video image starts until when the video image frame is displayed is referred to as "render-to-display latency." A double buffered system has an inherent latency of one frame time, or, put another way, the inherent latency is N frame periods, when the frame time is N frame periods long.

It is also known to provide more than two buffers, however this can increase latency to greater than one frame time in the absence of artificially imposed constraints.

Exemplary embodiments provide a new method for minimizing the render-to-display latency for a video display system, particularly a video display system as would be used in a very time-critical operation, such as in a display in an instrument such as an avionic instrument.

SUMMARY OF THE EXEMPLARY EMBODIMENTS OF THE INVENTION

Exemplary embodiments provide a method for reducing image latency in a video display system that uses a stroke video frame technique in which a video image is displayed for a stroke video frame period.

Such a system will typically comprise a display device and a plurality of raster memory buffers. Each raster memory buffer is adapted to be either in communication with a source for receiving image data when in a receiving condition or in communication with the display device when in a display condition.

A first step of the method is to divide the stroke video frame period into at least two raster memory time periods.

A second step is to provide the video display system, with the number of raster memory buffers equaling or exceeding the number of raster memory time periods per stroke video frame period A third step is to arrange the video display system such that one of the raster memory buffers is in the display condition for a first raster memory time period and the remainder of the raster memory buffers are in the receiving condition. During this step, the image data from the raster memory buffer in the display condition is displayed on the display device for a raster memory time period.

At the end of the raster time period, the arrangement of the raster memory buffers is rotated, so that the raster memory buffer in the display condition rotates into a receiving condition and one of the raster memory buffers in the receiving condition rotates into the display condition.

By repeating the displaying and rotating steps, the image latency is reduced.

In one embodiment of the invention, the video display system has four raster memory buffers, each of which is divided into four quarters for receiving stroke video frames in one-quarter portions. The stroke video frame period is divided into four raster memory time periods. Any given memory buffer is erased and receives one-quarter portion of a stroke video frame for three successive raster memory time periods, at the end of which these three one-quarter portions (and a blank one-quarter portion) are displayed for one raster memory time period.

A second embodiment of the invention has a video display system with five raster memory buffers, each of which is divided into four quarters for receiving stroke video frames in one-quarter portions. The stroke video frame period is divided into four raster memory time periods. Any given memory buffer is erased and receives one-quarter portion of a stroke video frame for four successive raster memory time periods, at the end of which these four one-quarter portions are displayed for one raster memory time period.

In a third embodiment of the invention, the video display system has four raster memory buffers, each of which is divided into four quarters for receiving stroke video frames in one-quarter portions. The stroke video frame period is divided into four raster memory time periods. Any given memory buffer is erased and receives one-quarter portion of a stroke video frame in the two successive raster memory time periods before it is displayed for one raster memory time period. The displayed data are two one-quarter portions of a stroke video frame and two blank one-quarter portions.

Obvious modifications are expected to fall within the scope of the claims, including increasing the number of memory buffers used in the video display system or staggering the order of the time periods or the ordering of the buffers. In addition to the above stated advantages, other advantages will be better understood from the following description of the drawings and detailed description of the preferred embodiment(s).

BRIEF DESCRIPTION OF THE DRAWINGS

A better understanding of the exemplary embodiments will be obtained when reference is made to the accompanying drawings, wherein identical parts are identified by identical reference numerals and wherein:

FIG. 2 is a graphical depiction of activity in the raster memory buffers during a sequence of eight time periods of the first embodiment, using the four-memory-buffer video display system of FIG. 1;

FIG. 4 is a graphical depiction of activity in the raster memory buffers during a sequence of eight time periods of the second embodiment, using the five-memory-buffer video display system of FIG. 3;

FIG. 5 is a graphical depiction of activity in the raster memory buffers during a sequence of eight time periods of the third embodiment, using the four-memory-buffer video display system of FIG. 1;

FIG. 6 is a graphical depiction of the display sequences for time periods T1 through T8 for the previous double buffer systems as well as embodiments of FIGS. 2, 4 and 5;

FIG. 7 is a graphical depiction of activity in the raster memory buffers during a sequence of eight time periods of the fourth embodiment, using the four-memory-buffer video display system of FIG. 1;

FIG. 9 is a graphical depiction of activity in the raster memory buffers during a sequence of eight time periods of the fifth embodiment using the three-memory-buffer video display system shown in FIG. 8.

DETAILED DESCRIPTION OF PREFERRED EMBODIMENTS

Embodiment 1

Figure 1:
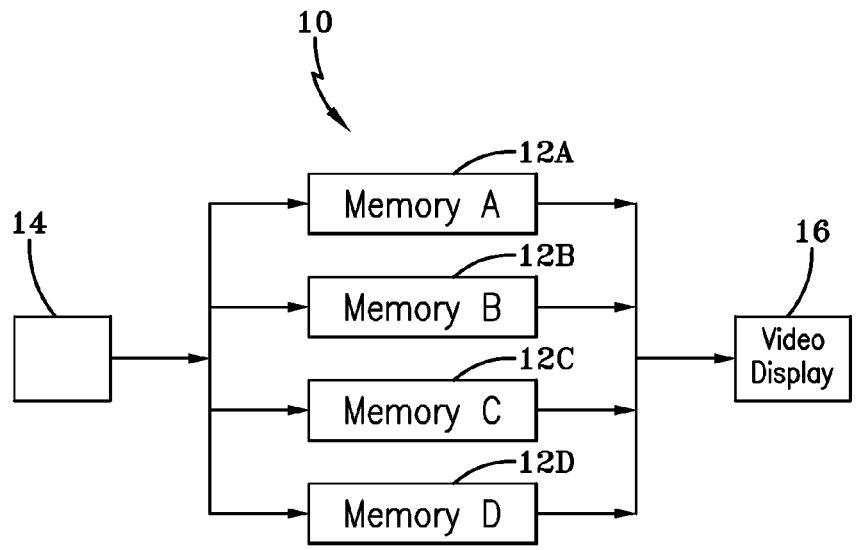
FIG. 1 is a schematic illustration of a four-memory-buffer video display system used in the first, third, and fourth embodiments.

FIG. 1 schematically illustrates a first embodiment 10 where four raster memory buffers 12, sub-designated as A through D, are provided. Each raster memory buffer 12 is divided into four quarters for receiving stroke video frames in one-quarter portions. Each raster memory buffer 12 is adapted to be in communication with an input source 14, from which input data comprising the stroke video frames are received, that is, each buffer may be in a receiving condition. Each raster memory buffer 12 is also adapted to be communicated with a display device 16, on which the data are visually presented, that is, each buffer may also be in a display condition. In this embodiment, the raster memory buffers 12 are rotated so that each becomes the "front" or display buffer once in each stroke video frame. In a 60 Hz system, for example, as is conventional in the United States, where a stroke video frame is 16.67 msec in duration, the raster memory buffers 12 will be sequentially rotated every 4.167 msec, that is, every 0.25 stroke video frame. In a 50 Hz system, as would be conventional in some countries, the rotation would be accordingly slowed down, a stroke video frame lasting 20 msec and the raster memory buffers being rotated every 5 msec. Because the raster memory buffer time periods (or "rmb time periods") will depend upon the stroke video frame periods, the rmb time periods will hereinafter be referred to in terms of fractional stroke video frame portions, which will be abbreviated as "svf". In other words, a raster memory buffer time period will be referred to as being "from 0 to 0.25 svf" instead of as being "from 0 to 4.167 msec," as would be the case in a 60 Hz-based system.

Referring to FIG. 2, during a first rmb time period T1 (0 to 0.25 svf), image data in raster memory buffer D are displayed. The displayed data are the last 75% of an image designated as Stroke Video Frame ("SVF") 0. The first quarter of raster memory buffer D will be empty, so the displayed image for that portion will be effectively a black screen, although the time on the screen will be sufficiently short that this will not be visually perceptible. Simultaneously (at least within rmb time period T1), a first quarter portion of SVF 1 is being written to raster memory buffers A, B and C. Since raster memory buffer C has been the immediately prior display buffer, it is erased before any writing is made to it. At this point, the fourth quarter portion of the SVF 0 data is up to one rmb time period old (i.e., up to 0.25 svf).

FIG. 2 graphically depicts not only the activity during first rmb time period T1, but also for seven subsequent time periods, designated T2 through T8, which will be described below. In FIG. 2, each column shows the status and displayed data for a particular rmb time period, the time periods being labeled as T1 through T8. Each row shows the status and displayed data for a particular raster memory buffer, designated A through D. Five lines of information are shown for each row. From top to bottom, the first line shows the status and activity of the raster memory buffer during the time period and the remaining four lines show the identity of the stroke video frame data stored in the first through fourth quarters (Q1 through Q4) of the raster memory buffer at the end of the time period. An "E" denotes that the portion of the raster memory buffer is "empty" or "erased."

As an example, the box in FIG. 2 for raster memory buffer D during time period T1 shows, in line 1, that raster memory buffer D is the "front" ("F") buffer and that it is in "display" mode. The first quarter (Q1) of its memory is empty, with quarters Q2 through Q4 containing data from the portions of SVF 0. During this same time period, raster memory buffer A is designated as R1, which means that it is the "rear" buffer that will be displayed in the next time period T2. It is in "write" mode, receiving the first quarter (Q1) of data for SVF 1. It is "empty" in Q2, and has data from SVF 0 in Q3 and Q4. Similarly, raster memory buffer B is designated as R2, which means that it is the "rear" buffer that will be displayed in two time periods, that is, at T3. It is also in "write" mode, receiving the first quarter (Q1) of data for SVF 1. It is "empty" in Q2 and Q3, and has data from SVF 0 in Q4. During time period T1, raster memory buffer C is designated as R3, which means that it is the "rear" buffer that was displayed in the immediately previous time period. Because it has just been displayed, raster memory buffer C is in "erase and write" ("E&W") mode, meaning that it is erased and then receives the first quarter (Q1) of data for SVF 1. Because of the erasure, raster memory buffer is "empty" in Q2 through Q4. The raster memory buffers in the receiving condition are arranged hierarchically, as indicated by the R1 through R3 designations.

During a second rmb time period T2 (0.25 to 0.50 svf), image data in raster memory buffer A are displayed. The displayed data are the last 50% of SVF 0 and the first 25% of SVF 1. Simultaneously (at least within rmb time period T2), a second quarter portion of SVF 1 is being written to raster memory buffers B, C and D. Before being written, raster memory buffer D is erased, removing any data from SVF 0. At this point, the first quarter portion of the SVF 1 data is up to one rmb time period old (i.e., up to 0.25 svf). As shown in FIG. 2, raster memory buffer A is the displayed, or "F", buffer and raster memory buffers B through D are the "rear" buffers, R1 through R3, respectively.

During a third rmb time period T3 (0.50 to 0.75 svf), raster memory buffer B advances from R1 to F and its data are displayed. The displayed data are the last 25% of SVF 0 and the first 50% of SVF 1. Simultaneously (at least within rmb time period T3), a third quarter portion of SVF 1 is being written to raster memory buffers C, D and A, which occupy positions R1 through R3. An erasure of raster memory buffer A is made before the writing there. At this point, the second quarter portion of the SVF 1 data is up to one rmb time period old (i.e., up to 0.25 svf).

During a fourth rmb time period T4 (0.75 to 1.0 svf), raster memory buffer C advances from R1 to F and its data are displayed. The displayed data are the first 75% of SVF 1, with SVF 0 being extinguished from display at this point. Simultaneously (at least within time period T4), a fourth quarter portion of SVF 1 is being written to raster memory buffers D, A and B, with an erasure of raster memory buffer B before the writing there. At this point, the third quarter portion of the SVF 1 data is up to one time period old (i.e., up to 0.25 svf).

During a fifth rmb time period T5 (1.0 to 1.25 svf), image data in raster memory buffer D are displayed. The displayed data are the last 75% of SVF 1, with the first quarter portion Q1 being empty. Simultaneously (at least within rmb time period T5), a first quarter portion of a new stroke video frame, designated as SVF 2, is being written to buffers A, B and C. An erasure of buffer C is made before the writing there. At this point, the fourth quarter portion of the SVF 1 data is up to one time period old (i.e., up to 0.25 svf). It will be noted that, at this point, a complete cycle has been made, so that any stored quarter portion of video data from SVF 2 at the end of this time period has replaced a corresponding quarter portion of data from SVF 1 stored in the same location at the end of rmb time period T1 and any stored quarter portion of video data from SVF 1 at the end of this time period has replaced a corresponding quarter portion of data from SVF 0 stored in the same location at the end of rmb time period T1.

Since the same process described for rmb time periods T1 through T4 is repeated during rmb time periods T5 through T8, the process is not described further, but FIG. 2 depicts the process graphically. Just for reference, it is noted that time period T6 covers from 1.25 to 1.50 svf, time period T7 spans from 1.50 to 1.75 svf and time period T8 spans from 1.75 to 2.0 svf.

From the above, and particularly from FIG. 2, it will be seen that the display method of this embodiment reduces the latency of the image portrayed. A consequence of this reduction is a reduction in the brightness of the display, as a one-quarter portion of the image is blank. Since the blank portion is continually rotated, the blank portion will not be visually perceived as long as the rmb time periods are sufficiently short.

Embodiment 2

Figure 3:
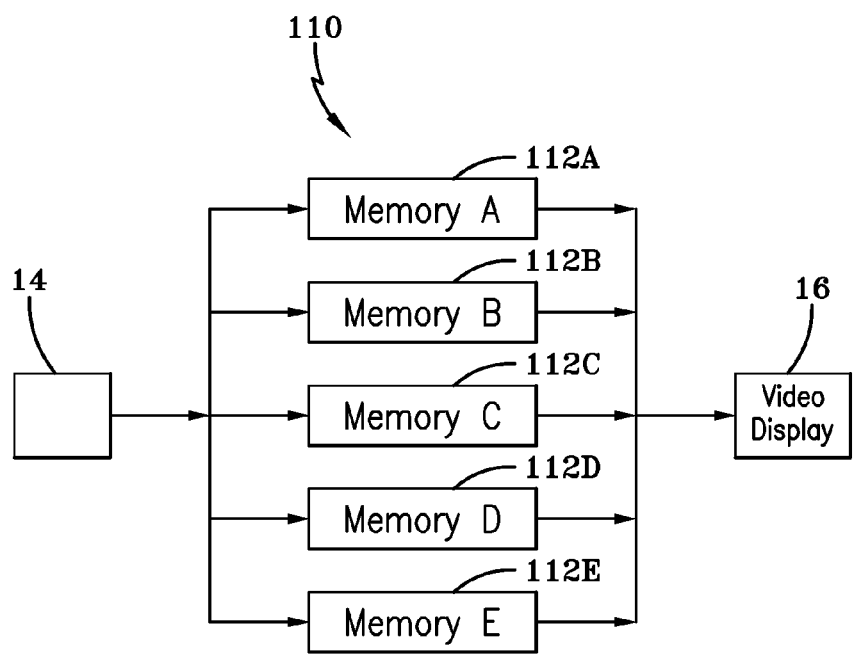
FIG. 3 is a schematic illustration of a five-memory-buffer video display system used in a second embodiment.

FIG. 3 schematically illustrates a five-memory-buffer video display system 110. In this setup, five raster memory buffers 112, sub-designated as A through E, are provided. Each raster memory buffer 112 is divided into four quarters for receiving stroke video frames in one-quarter portions. Each raster memory buffer 112 is in communication with an input source 14, from which input data comprising the stroke video frames are received. Each raster memory buffer 112 is also communicated with a display device 16, on which the data are visually presented. In this embodiment, the raster memory buffers 112 are rotated so that each becomes the "front" or display buffer once in each stroke video frame. In a 60 Hz system, for example, as is conventional in the United States, where a stroke video frame is 16.67 msec in duration, the raster memory buffers 112 will be sequentially rotated every 4.167 msec, that is, every 0.25 stroke video frame. In a 50 Hz system, as would be conventional in some countries, the rotation would be accordingly slowed down, a stroke video frame lasting 20 msec and the raster memory buffers being rotated every 5 msec. Because the rmb time periods will depend upon the stroke video frame periods, the rmb time periods will hereinafter be referred to in terms of fractional stroke video frame portions, which will be abbreviated as "svf". In other words, a raster memory buffer time period will be referred to as being "from 0 to 0.25 svf" instead of as being "from 0 to 4.167 msec," as would be the case in a 60 Hz-based system.

Referring to FIG. 4, during a first time period T1, image data in buffer E are displayed. The displayed data are 100% of an image designated as Frame 0. Simultaneously (at least within time period T1), a first quarter portion of SVF 1 is being written to buffers A, B, C and D. An erasure of buffer D is made before the writing there. At this point, the fourth quarter portion of the Frame 0 data is up to one time period old.

FIG. 4 graphically depicts not only the activity during first rmb time period T1, but also for seven subsequent time periods, designated T2 through T8, which will be described below. In FIG. 4, each column shows the status and displayed data for a particular rmb time period, the time periods being labeled as T1 through T8. Each of the rows shows the status and displayed data for a particular raster memory buffer, designated A through E. Five lines of information are shown for each row. From top to bottom, the first line shows the status and activity of the raster memory buffer during the time period and the remaining four lines show the identity of the stroke video frame data stored in the first through fourth quarters (Q1 through Q4) of the raster memory buffer at the end of the time period. An "E" denotes that the portion of the raster memory buffer is "empty" or "erased."

As an example, the box in FIG. 4 for raster memory buffer E during time period T1 shows, in line 1, that raster memory buffer E is the "front" ("F") buffer and that it is in "display" mode. Each of the four quarters of its memory (Q1 through Q4) are filled with portions of SVF 0. During this same time period, raster memory buffer A is designated as R1, which means that it is the "rear" buffer that will be displayed in the next time period T2. It is in "write" mode, receiving the first quarter (Q1) of data for SVF 1. It has data from SVF 0 in Q2 through Q4. Similarly, raster memory buffer B is designated as R2, which means that it is the "rear" buffer that will be displayed in two time periods, that is, at T3. It is also in "write" mode, receiving the first quarter (Q1) of data for SVF 1. It's "empty" in Q2 and has data from SVF 0 in Q3 and Q4. During time period T1, raster memory buffer C is designated as R3, which means that it is the "rear" buffer that was displayed two time periods before. Raster memory buffer C is in "write" mode, and it contains the first 25% of SVF 1 in Q1, Q2 and Q3 are empty, and it contains the last 25% of SVF 0 in Q4. Raster memory buffer D is designated as R4, meaning that it was the most-recently displayed buffer. It is in "erase and write" ("E&W") mode, meaning that it is erased and then receives the first quarter (Q1) of data for SVF 1. Because of the erasure, raster memory buffer D is "empty" in Q2 through Q4.

During a second time period T2, image data in buffer A are displayed. The displayed data are the last 75% of SVF 0 and the first 25% of SVF 1. Simultaneously (at least within time period T2), a second quarter portion of SVF 1 is being written to buffers B through E. An erasure of buffer E is made before the writing there. At this point, the first quarter portion of the SVF 1 data is up to one time period old.

During a third time period T3, image data in buffer B are displayed. The displayed data are the last 50% of SVF 0 and the first 50% of SVF 1. Simultaneously (at least within time period T3), a third quarter portion of SVF 1 is being written to buffers C, D, E and A. An erasure of buffer A is made before the writing there. At this point, the second quarter portion of the SVF 1 data is up to one time period old.

During a fourth time period T4, image data in buffer C are displayed. The displayed data are the first 75% of SVF 1 and the last 25% of SVF 0. Simultaneously (at least within time period T4), a fourth quarter portion of SVF 1 is being written to buffers D, E, A and B. An erasure of buffer B is made before the writing there. At this point, the third quarter portion of the SVF 1 data is up to one time period old.

During a fifth time period T5, image data in buffer D are displayed. The displayed data are 100% of SVF 1. Simultaneously (at least within time period T5), a first quarter portion of a new frame, designated as SVF 2, is being written to buffers E, A, B and C. An erasure of buffer C is made before the writing there. At this point, the fourth quarter portion of the SVF 1 data is up to one time period old.

Unlike Embodiment 1, the scheme of Embodiment 2 does not complete a full cycle in four time periods. For that reason, a description of the activity in time periods T6 through T8 is provided.

During a sixth time period T6, image data in buffer E are displayed. The displayed data are the last 75% of SVF 1 and the first 25% of SVF 2. Simultaneously (at least within time period T6), a second quarter portion of SVF 2 is being written to buffers A through D. An erasure of buffer D is made before the writing there. At this point, the first quarter portion of the SVF 2 data is up to one time period old.

During a seventh time period T7, image data in buffer A are displayed. The displayed data are the last 50% of SVF 1 and the first 50% of SVF 2. Simultaneously (at least within time period T7), a third quarter portion of SVF 2 is being written to buffers B through E. An erasure of buffer E is made before the writing there. At this point, the second quarter portion of the SVF 2 data is up to one time period old.

During an eighth time period T8, image data in buffer B are displayed. The displayed data are the first 75% of SVF 2 and the last 25% of SVF 1. Simultaneously (at least within time period T8), a fourth quarter portion of SVF 2 is being written to buffers A, C, D and E. An erasure of buffer A is made before the writing there. At this point, the third quarter portion of the SVF 2 data is up to one time period old.

From the above, and particularly from FIG. 4, it will be seen that the display method of this embodiment reduces the latency of the image portrayed. Unlike the method of Embodiment 1, this reduction is achieved without a loss of brightness, although the reduction is achieved by adding an additional rear memory buffer to the rotation.

Embodiment 3

A third embodiment is achieved using the same four-memory-buffer setup as shown in FIG. 1. In this embodiment, as in the first embodiment, four memory buffers, designated as A through D, are provided.

Referring to FIG. 5, during a first rmb time period T1 (0 to 0.25 svf), image data in raster memory buffer D are displayed. The displayed data are the last 50% of an image designated as Stroke Video Frame ("SVF") 0. The first two quarters of raster memory buffer D will be empty, so the displayed image for those portions will be effectively a black screen, although the time on the screen will be sufficiently short that this will not be visually perceptible. Simultaneously (at least within rmb time period T1), a first quarter portion of SVF 1 is being written to raster memory buffers A, B and C. In one variation of this embodiment, raster memory buffers B and C are erased before any writing is made to them. In another embodiment, raster memory buffer C is only erased during time period T1 and no writing is made to it. In a third variation of this embodiment, no action is taken regarding raster memory buffer C during this time period T1. In any of these events, the fourth quarter portion of the SVF 0 data is up to one rmb time period old (i.e., up to 0.25 svf).

FIG. 5 graphically depicts not only the activity during first rmb time period T1, but also for seven subsequent time periods, designated T2 through T8, which will be described below. In FIG. 5, each column shows the status and displayed data for a particular rmb time period, the time periods being labeled as T1 through T8. Each of the rows shows the status and displayed data for a particular raster memory buffer, designated A through D. Five lines of information are shown for each row. From top to bottom, the first line shows the status and activity of the raster memory buffer during the time period and the remaining four lines show the identity of the stroke video frame data stored in the first through fourth quarters (Q1 through Q4) of the raster memory buffer at the end of the time period. An "E" denotes that the portion of the raster memory buffer is "empty" or "erased."

As an example, the box in FIG. 5 for raster memory buffer D during time period T1 shows, in line 1, that raster memory buffer D is the "front" ("F") buffer and that it is in "display" mode. The first half (quarters Q1 and Q2) of its memory is empty, with quarters Q3 and Q4 containing data from the portions of SVF 0. During this same time period, raster memory buffer A is designated as R1, which means that it is the "rear" buffer that will be displayed in the next time period T2. It is in "write" mode, receiving the first quarter (Q1) of data for SVF 1. It is "empty" in Q2 and Q3, and it has data from SVF 0 in Q4. Similarly, raster memory buffer B is designated as R2, which means that it is the "rear" buffer that will be displayed in two time periods, that is, at T3. It is also in "erase and write" (E&W) mode, receiving the first quarter (Q1) of data for SVF 1. Because it has been erased before being written, it is "empty" in Q2 and Q3. During time period T1, raster memory buffer C is designated as R3, which means that it is the "rear" buffer that was displayed in the immediately previous time period. Under the depicted scheme, raster memory buffer C is in "erase and write" ("E&W") mode, meaning that it is erased and then receives the first quarter (Q1) of data for SVF 1. Because of the erasure, raster memory buffer is "empty" in Q2 through Q4. However, as noted above, it is not necessary to erase and write the raster memory buffer in position R3, because it will be erased and written when it reaches the status of position R2. For that reason, raster memory buffer R3 can also be erased but not written in this time period or it can be entirely ignored.

During a second rmb time period T2 (0.25 to 0.50 svf), image data in raster memory buffer A are displayed. The displayed data are the last 25% of SVF 0 and the first 25% of SVF 1, with Q2 and Q3 being empty. Simultaneously (at least within rmb time period T2), a second quarter portion of SVF 1 is being written to at least raster memory buffers B and C. Before being written, raster memory buffer C (and possibly D) is erased, removing any data from SVF 0. At this point, the first quarter portion of the SVF 1 data is up to one rmb time period old (i.e., up to 0.25 svf). As shown in FIG. 5, raster memory buffer A is the displayed, or "F", buffer and raster memory buffers B through D are the "rear" buffers, R1 through R3, respectively. Raster memory buffer D, being in the R3 position, may be erased and written, only erased, or ignored, as was described for rmb C during time period T1.

During a third rmb time period T3 (0.50 to 0.75 svf), raster memory buffer B advances from R1 to F and its data are displayed. The displayed data are the first 50% of SVF 1, with the Q3 and Q4 empty. Simultaneously (at least within rmb time period T3), a third quarter portion of SVF 1 is being written to at least raster memory buffers C and D. Before being written, raster memory buffer D (and possibly A) is erased. At this point, the second quarter portion of the SVF 1 data is up to one rmb time period old (i.e., up to 0.25 svf). Raster memory buffer A, being in the R3 position, may be erased and written, only erased, or ignored, as was described for rmb C during time period T1.

During a fourth rmb time period T4 (0.75 to 1.0 svf), raster memory buffer C advances from R1 to F and its data are displayed. The displayed data are the middle two quarters of SVF 1, with the Q1 and Q4 being empty. Simultaneously (at least within time period T4), a fourth quarter portion of SVF 1 is being written to at least raster memory buffers D and A. Before being written, raster memory buffer A (and possibly B) is erased. At this point, the third quarter portion of the SVF 1 data is up to one rmb time period old (i.e., up to 0.25 svf). Raster memory buffer B, being in the R3 position, may be erased and written, only erased, or ignored, as was described for rmb C during time period T1.

During a fifth rmb time period T5 (1.0 to 1.25 svf), image data in raster memory buffer D are displayed. The displayed data are the last half of SVF 1, with Q1 and Q2 being empty. Simultaneously (at least within rmb time period T5), a first quarter portion of a new stroke video frame, designated as SVF 2, is being written to at least buffers A and B. Before being written, raster memory buffer B (and possibly C) is erased. At this point, the fourth quarter portion of the SVF 1 data is up to one rmb time period old (i.e., up to 0.25 svf). Raster memory buffer C, being in the R3 position, may be erased and written, only erased, or ignored, as was described for buffer C during time period T1. At this point, the fourth quarter portion of the SVF 1 data is up to one time period old (i.e., up to 0.25 svf). It will be noted that, at this point, a complete cycle has been made, so that any stored quarter portion of video data from SVF 2 at the end of this time period has replaced a corresponding quarter portion of data from SVF 1 stored in the same location at the end of rmb time period T1 and any stored quarter portion of video data from SVF 1 at the end of this time period has replaced a corresponding quarter portion of data from SVF 0 stored in the same location at the end of rmb time period T1.

Since the same process described for rmb time periods T1 through T4 is repeated during rmb time periods T5 through T8, the process is not described further, but FIG. 5 depicts the process graphically. Just for reference, it is noted that time period T6 covers from 1.25 to 1.50 svf, time period T7 spans from 1.50 to 1.75 svf and time period T8 spans from 1.75 to 2.0 svf.

From the above, and particularly from FIG. 5, it will be seen that the display method of this embodiment reduces the latency of the image portrayed even further than in Embodiment 1. A consequence of this reduction is a further reduction in the brightness of the display from that of Embodiment 1, as one-half of the image is blank. Since the blank portion is continually rotated, the blank portion will not be visually perceived as long as the rmb time periods are sufficiently short.

Further aspects of the various embodiments will be appreciated when reference is made to FIG. 6, which compares the display performance of the first three embodiments of the with that of a double-buffered system as described in the background. Rather than showing the activity in each individual buffer (as in FIGS. 2, 4 and 5), FIG. 6 focuses on the displayed image at each time period, the time periods being presented as columns of the figure. Each column shows the status and displayed data for a particular rmb time period, the time periods being labeled as T1 through T8. Each row shows the status and displayed data for one of the particular embodiments, designated "Double-Buffer" and Embodiments 1 through 3. Five lines of information are shown for each row. From top to bottom, the first line shows the designation of the displayed raster memory buffer during the time period. The remaining four lines show the identity of the stroke video frame data stored in the first through fourth quarters (Q1 through Q4) of the raster memory buffer at the end of the time period. An "E" denotes that the portion of the raster memory buffer is "empty" or "erased."

As an example, the box in FIG. 6 for Embodiment 1 during time period T1 shows, in line 1, that raster memory buffer D is the displayed buffer. The first quarter (Q1) of its memory is empty, with quarters Q2 through Q4 containing data from the portions of SVF 0. Because the activity in the remaining raster memory buffers (buffers A through C in Embodiment 1) is not visible to a user, there is no need to display them.

Comparing the respective rows, it is apparent that the latency of the images has been reduced in each of Embodiments 1 through 3 from that of the double-buffered method. This is observed for example, by noting that each of the embodiments has replaced at least a portion of data still being displayed in the double-buffer system by time period T2 and that the effect is particularly pronounced by time period T4. The cost of this is also easily observed in FIG. 6, by the presence of subsequent stroke video frame data or blank portions, but, as described above, this presence is not visually perceived by the user, provided that the time periods are selected to be arbitrarily short.

This understanding leads to at least two additional embodiments of the invention, which are now taught.

Embodiment 4

A fourth embodiment is achieved using the same four-memory-buffer setup as shown in FIG. 1. In this embodiment, as in the first embodiment, four memory buffers, designated as A through D, are provided. In this situation, however, the stroke video frame period is to be divided in to three raster memory buffer ("rmb") time periods, instead of the four into which it has been divided in the first three embodiments. In a 60 Hz system, for example, as is conventional in the United States, where a stroke video frame is 16.67 msec in duration, the raster memory buffers 112 will be sequentially rotated every 5.556 msec, that is, every 0.33 stroke video frame. In a 50 Hz system, as would be conventional in some countries, the rotation would be accordingly slowed down, a stroke video frame lasting 20 msec and the raster memory buffers being rotated every 6.667 msec. Because the rmb time periods will depend upon the stroke video frame periods, the rmb time periods will hereinafter be referred to in terms of fractional stroke video frame portions, which will be abbreviated as "svf". In other words, a raster memory buffer time period will be referred to as being "from 0 to 0.33 svf" instead of as being "from 0 to 5.556 msec," as would be the case in a 60 Hz-based system.

Because there are four raster memory buffers and three rmb time periods per stroke video frame, this embodiment is analogous to Embodiment 2 above. However, the memory buffers are divided into one-third portions and video image data is received in one-third portions.

During a first time period T1, image data in buffer D are displayed. The displayed data are 100% of an image designated as Frame 0. Simultaneously (at least within time period T1), a first one-third portion of SVF 1 is being written to buffers A, B and C. An erasure of buffer C is made before the writing there. At this point, the third one-third portion of the Frame 0 data is up to one time period old.

FIG. 7 graphically depicts not only the activity during first rmb time period T1, but also for seven subsequent time periods, designated T2 through T8, which will be described below. In FIG. 7, each column shows the status and displayed data for a particular rmb time period, the time periods being labeled as T1 through T8. Each of the rows shows the status and displayed data for a particular raster memory buffer, designated A through D. Four lines of information are shown for each row. From top to bottom, the first line shows the status and activity of the raster memory buffer during the time period and the remaining three lines show the identity of the stroke video frame data stored in the first through third one-third portions (P1 through P3) of the raster memory buffer at the end of the time period. An "E" denotes that the portion of the raster memory buffer is "empty" or "erased."

As an example, the box in FIG. 7 for raster memory buffer D during time period T1 shows, in line 1, that raster memory buffer D is the "front" ("F") buffer and that it is in "display" mode. Each of the three one-third portions of its memory (P1 through P3) are filled with portions of SVF 0. During this same time period, raster memory buffer A is designated as R1, which means that it is the "rear" buffer that will be displayed in the next time period T2. It is in "write" mode, receiving the first one-third portion (P1) of data for SVF 1. It has data from SVF 0 in P2 and P3. Similarly, raster memory buffer B is designated as R2, which means that it is the "rear" buffer that will be displayed in two time periods, that is, at T3. It is also in "write" mode, receiving the first one-third portion (P1) of data for SVF 1. It is "empty" in P2 and has data from SVF 0 in P3. During time period T1, raster memory buffer C is designated as R3, which means that it is the "rear" buffer that was displayed two time periods before. Raster memory buffer C is in "erase and write" ("E&W") mode, meaning that it is erased and then receives the first one-third portion of data for SVF 1, which is stored in P1. P2 and P3 are empty, due to the erasure.

During a second time period T2, image data in buffer A are displayed. The displayed data are the two-thirds of SVF 0 and the first one-third of SVF 1. Simultaneously (at least within time period T2), a second one-third portion of SVF 1 is being written to buffers B through D. An erasure of buffer D is made before the writing there. At this point, the first one-third portion of the SVF 1 data is up to one time period old.

During a third time period T3, image data in buffer B are displayed. The displayed data are the last one-third of SVF 0 and the first two-thirds of SVF 1. Simultaneously (at least within time period T3), the last one-third portion of SVF 1 is being written to buffers C, D, and A. An erasure of buffer A is made before the writing there. At this point, the second one-third portion of the SVF 1 data is up to one time period old.

During a fourth time period T4, image data in buffer C are displayed. The displayed data are 100% of SVF, SVF 0 now being extinguished. Simultaneously (at least within time period T4), a first one-third portion of SVF 2 is being written to buffers D, A and B. An erasure of buffer B is made before the writing there. At this point, the last one-third portion of the SVF 1 data is up to one time period old.

During a fifth time period T5, image data in buffer D are again displayed. The displayed data are the last two-thirds of SVF 1 and the first one-third of SVF2. Simultaneously (at least within time period T5), the second one-third portion of SVF 2, is being written to buffers A, B and C. An erasure of buffer C is made before the writing there. At this point, the first one-third portion of the SVF 2 data is up to one time period old.

At this point, an entire cycle through the Embodiment 4 scheme has been described, and FIG. 7 shows the activity through time period T8. In comparing FIG. 7 with FIG. 4, one should keep in mind that the rmb time periods in FIG. 7 are longer than the time periods in FIG. 4.

Embodiment 5

Figure 8:
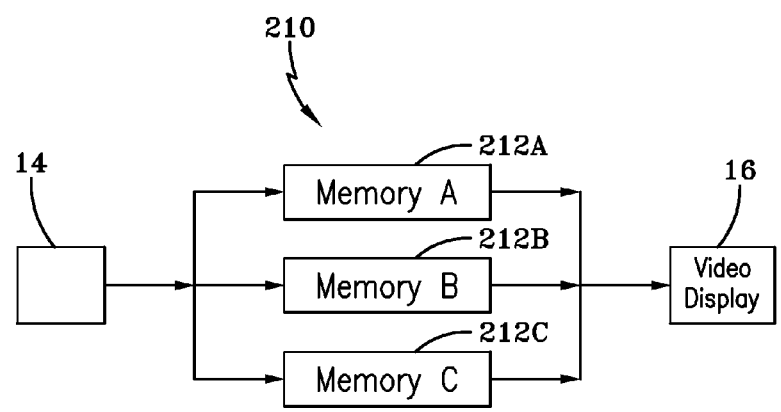
FIG. 8 is a schematic illustration of a three-memory-buffer video display system used in a fifth embodiment.

FIG. 8 schematically illustrates a three-memory-buffer video display system 210. In this embodiment, three raster memory buffers 212, sub-designated as A through C, are provided. Each raster memory buffer 212 is divided into three one-third portions (not shown in FIG. 8) for receiving stroke video frames in one-third portions. Each raster memory buffer 212 is in communication with an input source 14, from which input data comprising the stroke video frames are received. Each raster memory buffer 212 is also communicated with a display device 16, on which the data are visually presented. In this embodiment, the raster memory buffers 212 are rotated so that each becomes the "front" or display buffer once in each stroke video frame. As in Embodiment 4, in a 60 Hz system, where a stroke video frame is 16.67 msec in duration, the raster memory buffers 212 will be sequentially rotated every 5.556 msec, that is, every 0.33 stroke video frame. In a 50 Hz system, as would be conventional in some countries, the rotation would be accordingly slowed down, a stroke video frame lasting 20 msec and the raster memory buffers being rotated every 6.67 msec. Because the raster memory buffer time periods (or "rmb time periods") will depend upon the stroke video frame periods, the rmb time periods will hereinafter be referred to in terms of fractional stroke video frame portions, which will be abbreviated as "svf". In other words, a raster memory buffer time period will be referred to as being "from 0 to 0.33 svf" instead of as being "from 0 to 5.556 msec," as would be the case in a 60 Hz-based system.

During a first rmb time period T1 (0 to 0.33 svf), image data in raster memory buffer C are displayed. The displayed data are the last two-thirds of an image designated as Stroke Video Frame ("SVF") 0. The first one-third portion of raster memory buffer C will be empty, so the displayed image for that portion will be effectively a black screen, although the time on the screen will be sufficiently short that this will not be visually perceptible. Simultaneously (at least within rmb time period T1), a first one-third portion of SVF 1 is being written to raster memory buffers A and B. Since raster memory buffer B has been the immediately prior display buffer, it is erased before any writing is made to it. At this point, the last one-third portion of the SVF 0 data is up to one rmb time period old (i.e., up to 0.33 svf).

In a manner that will now be familiar, FIG. 9 graphically depicts not only the activity during first rmb time period T1, but also for subsequent time periods T2 through T8. In FIG. 9, each column shows the status and displayed data for a particular rmb time period, the time periods being labeled as T1 through T8. Each row shows the status and displayed data for a particular raster memory buffer, designated A through C. Four lines of information are shown for each row. From top to bottom, the first line shows the status and activity of the raster memory buffer during the time period and the remaining three lines show the identity of the stroke video frame data stored in the first through third one-third portions (P1 through P3) of the raster memory buffer at the end of the time period. An "E" denotes that the portion of the raster memory buffer is "empty" or "erased."

During a second rmb time period T2 (0.33 to 0.67 svf), image data in raster memory buffer A are displayed. The displayed data are the last one-third of SVF 0 and the first one-third of SVF 1, with the middle one-third portion of the display being blank or empty. Simultaneously (at least within rmb time period T2), a second one-third portion of SVF 1 is being written to raster memory buffers B and C. Before being written, raster memory buffer C is erased, removing any data from SVF 0. At this point, the first one-third portion of the SVF 1 data is up to one rmb time period old (i.e., up to 0.33 svf).

During a third rmb time period T3 (0.67 to 1.0 svf), raster memory buffer B advances from R1 to F and its data are displayed. The displayed data are the first two-thirds of SVF 1, the last one-third of the display being blank or empty. Simultaneously (at least within rmb time period T3), the last one-third portion of SVF 1 is being written to raster memory buffers C and A. An erasure of raster memory buffer A is made before the writing there. At this point, the second one-third portion of the SVF 1 data is up to one rmb time period old (i.e., up to 0.33 svf).

During a fourth rmb time period T4 (1.0 to 1.33 svf), raster memory buffer C advances from R1 to F and its data are displayed. The displayed data are the last two-thirds of SVF 1, with the first one-third of the display being blank or empty. Simultaneously (at least within time period T4), a first one-third portion of SVF 2 is being written to raster memory buffers A and B, with an erasure of raster memory buffer B before the writing there. At this point, the last one-third portion of the SVF 1 data is up to one time period old (i.e., up to 0.33 svf).

At this point, FIG. 9 shows that the Embodiment 5 has cycled, so that any stored one-third portion of video data from SVF 2 at the end of this time period has replaced a corresponding quarter portion of data from SVF 1 stored in the same location at the end of rmb time period T1 and any stored quarter portion of video data from SVF 1 at the end of this time period has replaced a corresponding quarter portion of data from SVF 0 stored in the same location at the end of rmb time period T1.

Since the same process described for rmb time periods T1 through T4 is repeated during rmb time periods T5 through T8, the process is not described further, but FIG. 2 depicts the process graphically.

From the above, and particularly from FIG. 9, it will be seen that the display method of this embodiment reduces the latency of the image portrayed. A consequence of this reduction is a reduction in the brightness of the display, as a one-third portion of the image is blank. Since the blank portion is continually rotated, the blank portion will not be visually perceived as long as the rmb time periods are sufficiently short.

It is thought that the advantages of the exemplary embodiments will be apparent from the description of the preferred embodiments, drawings, and specification contained herein. It will be appreciated that after reading this specification those skilled in the art will arrive at various modifications to the invention described herein and these modifications are anticipated to fall within the scope of the claims contained herein.

What is claimed is:

1. A method for reducing image latency in a video display system using a stroke video frame technique in which a video image is displayed for a stroke video frame period, the system comprising a display device and a plurality of raster memory buffers, each of which is adapted to be either in communication with a source for receiving image data when in a receiving condition or in communication with the display device when in a display condition, the method comprising the steps of:

dividing the stroke video frame period into at least two raster memory time periods;

providing the video display system, such that the number of raster memory buffers equals or exceeds the number of raster memory time periods per stroke video frame period;

arranging the video display system such that only one of the raster memory buffers is in the display condition for a first raster memory time period and the remainder of the raster memory buffers are in the receiving condition;

displaying on the display device the image data from the raster memory buffer in the display condition for a raster memory time period where the raster memory buffer in the display condition contains information for two separate video frames; and rotating the arrangement of the raster memory buffers at the end of the raster memory time period, so that the raster memory buffer in the display condition rotates into a receiving condition and one of the raster memory buffers in the receiving condition rotates into the display condition.

2. The video display method of claim 1, wherein:
the raster memory buffers in the receiving condition are arranged in a hierarchical structure from a lowest position to a highest position; and
in the rotating step, the raster memory buffer in the highest position of the receiving condition is rotated into the display condition and the raster memory buffer in the display condition rotates into the lowest position of the receiving condition.

3. The video display method of claim 2, further comprising the step of:
writing a portion of a video image as image data into at least one of the raster memory buffers in the receiving condition during each raster memory time period.

4. The video display method of claim 3, wherein:
the portion of a video image written to at least one of the raster memory buffers in the receiving condition is at least 1/Nth of a stroke video frame, where the raster memory time period is 1/Nth of the stroke video frame period.

5. The video display method of claim 3, wherein:
the raster memory buffer rotating into the lowest position of the receiving condition is erased before any video image data is written to it.

6. The video display method of claim 5, wherein:
the stroke video frame is divided into four raster memory time periods;
the video display system is provided with four raster memory buffers; and
image data for one-quarter of a video stroke frame are written to at least one of the memory buffers in the receiving condition in each raster memory time period.

7. The video display method of claim 6, wherein:
image data are written to three raster memory buffers in the receiving condition in each raster memory time period.

8. The video display method of claim 5, wherein:
the stroke video frame is divided into four raster memory time periods;
the video display system is provided with five raster memory buffers; and
image data for one-quarter of a video stroke frame are written to at least one of the memory buffers in the receiving condition in each raster memory time period.

9. The video display method of claim 8, wherein:
image data are written to four raster memory buffers in the receiving condition in each raster memory time period.

10. The video display method of claim 5, wherein:
the stroke video frame is divided into three raster memory time periods;
the video display system is provided with four raster memory buffers; and
image data for one-third of a video stroke frame are written to at least one of the memory buffers in the receiving condition in each raster memory time period.

11. The video display method of claim 5, wherein:
the stroke video frame is divided into three raster memory time periods;
the video display system is provided with three raster memory buffers; and
image data for one-third of a video stroke frame are written to at least one of the memory buffers in the receiving condition in each raster memory time period.

12. A video display panel comprising:
an input source comprising data for a plurality of stroke video frames wherein each frame is divided into a plurality of raster memory time periods;
a display assembly; and
a plurality of raster memory buffers operatively connected to said input source and said display assembly and adapted to:
send stored video frame data from one raster memory buffer to said display;
erase a raster memory buffer whose data was previously sent to said display assembly;
receive stroke video frame data from said input source; and
wherein only one raster memory buffer sends stored video data to the display assembly during each raster memory time period and where the raster memory buffer which is sending video data contains information for two separate stroke video frames.

13. The video display panel of claim 12:
wherein said display assembly is a liquid crystal display.

14. The video display panel of claim 12 comprising five raster memory buffers.

15. The video display panel of claim 12 wherein:
each stroke video frame is divided into four raster memory time periods.

16. The video display panel of claim 12 wherein:
each stroke video frame is divided into three raster memory time periods.

17. A video display panel comprising:
an input source comprising data for a plurality of stroke video frames wherein each frame is divided into a plurality of N raster memory time periods;
a display assembly; and
a number of raster memory buffers equal to or greater than the number of raster memory time periods, wherein said raster memory buffers are operatively connected to said input source and said display assembly and adapted to:
send stored video frame data from one raster memory buffer to said display where the raster memory buffer which sends the video data contains information for two separate video frames;
erase raster memory buffers whose data was sent to said display assembly during the immediately previous raster memory time period;
receive 1/Nth of the full stroke video frame data during each raster memory time period by raster memory buffers which are not sending data to said display; and wherein the raster memory buffers are rotated such that only one buffer sends stored video data to said display for each raster memory time period within a given video frame.

18. The video display panel of claim 17:

wherein said display assembly is a liquid crystal display.

19. The video display panel of claim 17 comprising five raster memory buffers.

20. The video display panel of claim 17 wherein:

each stroke video frame is divided into four raster memory time periods.

\* \* \* \* \*